United States Patent
Hild et al.

(10) Patent No.: US 6,922,778 B2
(45) Date of Patent: Jul. 26, 2005

(54) TRANSCODING IN DATA COMMUNICATIONS

(75) Inventors: Stefan G. Hild, Adliswil (CH); Luke J. O'Connor, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 09/734,631

(22) Filed: Dec. 11, 2000

(65) Prior Publication Data

US 2001/0043616 A1 Nov. 22, 2001

(30) Foreign Application Priority Data

Dec. 14, 1999 (EP) .............................. 99811158

(51) Int. Cl.[7] .............................................. H04L 9/00
(52) U.S. Cl. ...................................................... 713/181
(58) Field of Search ................................ 380/24, 9, 23, 380/25, 49; 713/156, 157, 181; 395/186, 187; 705/26, 35, 39, 40

(56) References Cited

U.S. PATENT DOCUMENTS 6,072,870 A * 6/2000 Nguyen et al. ............... 705/79

* cited by examiner

Primary Examiner—Gregory A Morse
Assistant Examiner—Ellen C Tran
(74) Attorney, Agent, or Firm—Douglas W. Cameron; Anne V. Dougherty (57) ABSTRACT

Methods and apparatus are provided for transcoding a data message, comprising a plurality of data fields (f1–f10) and an authentication code (Sgn(h1–10)), to produce a transcoded message for transmission to a destination device (4). The transcoding methods can be applied to such a data message which is received from a source device (1) wherein said data fields (f1–f10) have been coded in accordance with a first coding system, whereby respective data field codes (h1–h10) are generated for said data fields (f1–f10) and a message code (h1–10) is derived from said data field codes (h1–h10), and wherein said message code (h1–10) has been coded in accordance with a second coding system to generate said authentication code (Sgn(h1–10)). For each data field (f1–f10) of the received data message it is decided whether to maintain, modify or omit that field. For a field to be maintained, that field is maintained in the transcoded message. For a field to be omitted, that field is coded in accordance with said first coding system to generate an omitted field code dependent upon the data field code (h) for that field, and that field is replaced by said omitted field code in the transcoded message. For a field to be modified, that field is coded in accordance with said first coding system to generate a modified field code dependent upon the data field code (h) for that field, and that field is replaced by a modified field, comprising modified data (f') and said modified field code, in the transcoded message. The received authentication code (Sgn(h1–10)) is also included in the transcoded message. Sufficient information is thereby included in the transcoded message to enable the destination device to verify the transcoding operation.

25 Claims, 4 Drawing Sheets

TRANSCODING IN DATA COMMUNICATIONS

FIELD OF THE INVENTION

This invention relates generally to transcoding in data communications systems. More particularly, embodiments of the invention provide transcoders and transcoding methods, and apparatus and methods for use with or incorporating such transcoding systems.

BACKGROUND OF THE INVENTION

Data access and manipulation devices proliferate in many different forms, with widely varying input, output and processing capabilities. This creates difficulties in providing general purpose access to centralized processing and database systems, since such a large range of devices must be accommodated. Typically such centralized systems are primarily designed to be accessed by powerful devices such as PCs which have sophisticated processing and I/O capabilities compared to many data manipulation devices currently in use. As an example of the problem, it is becoming increasingly desirable to provide users with mobile access to centralized systems over the Internet via portable devices such as small, hand-held computing devices, pagers and mobile phones. In the case of the Internet, for example, the vast majority of users have access via browsers running on powerful computing devices such as PCs with relatively high-speed, high bandwidth communications links, and the nature of the data that can be retrieved from the Internet, in terms of the structure, variety and complexity of its content, has developed with such powerful devices in mind. However, the expectations of the data handling capabilities of the recipient device far exceed the capabilities of many portable access devices, which may have slow communications links, limited processing power and unsophisticated display hardware.

To accommodate such a range of data access devices and allow them access to centralized systems, modern data delivery chains incorporate devices known as "transcoders". A transcoder processes generically formatted data content in a message received from a source device such as a server to produce a device-specific data message adapted to the capabilities of the intended destination device. Common tasks that a transcoder might perform include the removal of non-essential data, conversion between different data formats, data compression or decompression, and general processing of data content to simplify the resulting message. In simple terms, however, transcoder operations can be categorized as one of three main types of operation, namely: omitting data, whereby certain data is removed from the received message; maintaining data, whereby certain data in the received message is maintained without change; or modifying data, whereby certain data in the received message is changed in some way, e.g., by altering the existing data through processing, or replacing the existing data with new data. In this context, it will be understood that the "message" on which the transcoder operates may be any type of data communication to be delivered from a source device to a destination device, from a simple document to a complex communication with textual, graphics, audio or visual content.

Incorporating the transcoding function into source or destination devices is impractical for all but a few highly security-sensitive applications due to the additional software and hardware requirements and the consequent cost implications, particularly as data access devices and transcoder functionality evolve quite rapidly. External transcoder services, provided for example by portable device manufacturers, network operators or ISPs, offer a more practical solution. In such cases in particular, however, the question of security arises. Specifically, the "verifiability" of the transcoder action, ie. the ability of the end user to verify that the message content has not been unacceptably or maliciously altered in the transcoding process, becomes a concern. Common cryptographic facilities, such as "message hashing", can provide verification that a message has not been altered during transit, but transcoders need to alter messages in order to accomplish their task. While some of the alterations may be legitimate, others could be malicious. As a highly simplistic example, consider that the following message is received by a transcoder from an origin server:

Original message: Do you wish to transfer $10 from account A to account B?

For a destination device with limited output capability, a transcoder may generate View 1 as follows:

View 1: transfer $10 from A to B?

Alternatively, the message might be altered to View 2 as follows:

View 2: transfer $100 from B to A?

Clearly View 1 is a legitimate rendition of the original message whereas View 2 is a malicious, unacceptable rendition.

It should be evident that an automatic method for verifying the semantic content of a message against the original is not feasible. For example, another possible rendition of the above message is View 3 as follows:

View 3: credit $10 from B to A?

This is a legitimate rendition of the original message, but it is infeasible to verify automatically that the meaning of "credit" here is equivalent to the meaning of "transfer" in the original message.

It will be apparent from the above that an efficient system allowing verification of transcoder action to the extent feasible would be of significant advantage in data communications systems where transcoding is required.

It is therefore an object of the invention to provide a system and method for transcoding a data message.

SUMMARY OF THE INVENTION

According to one aspect of the present invention there is provided a method of transcoding a data message, comprising a plurality of data fields and an authentication code, to produce a transcoded message for transmission to a destination device, the data message being received from a source device wherein said data fields have been coded in accordance with a first coding system, whereby respective data field codes are generated for said data fields and a message code is derived from said data field codes, and wherein said message code has been coded in accordance with a second coding system to generate said authentication code, the method comprising:

determining for each data field of the received data message whether to maintain, modify or omit that field;

for a field to be maintained, maintaining that field in said transcoded message;

for a field to be omitted, coding the field in accordance with said first coding system to generate an omitted field code dependent upon the data field code for that field, and replacing that field by said omitted field code in the transcoded message; and for a field to be modified, coding that field in accordance with said first coding system to generate a modified field code dependent upon the data field code for that field, and replacing that field by a modified field, comprising modified data and said modified field code, in the transcoded message; and including said authentication code in the transcoded message.

In transcoding methods embodying the present invention, therefore, on receipt of a data message as defined above, it is determined in the usual way whether to maintain, modify or omit each data field of the received message, and the transcoded message is produced accordingly. In particular, a field to be omitted is replaced by an omitted field code in the transcoded message, and a field to be modified is replaced in the transcoded message by a modified field comprising the modified data and a modified field code. Generation of an omitted or modified field code involves at least the step of coding the original field in accordance with said first coding system, whereby the resulting omitted or modified field code is dependent on the data field code for that field. The resulting transcoded message comprises maintained data fields, omitted field codes, modified fields and the authentication code from the received message. Since the omitted and modified field codes are dependent on the original data field codes generated by the source device, a destination device to which the first coding system is known can derive from the transcoded message all the information it needs to regenerate the message code. Assuming the second coding system is also known to the destination device, the destination device can then verify that the message code derived from the transcoded message corresponds to the message code encoded in the authentication code by the source device. Thus, with transcoding methods embodying the invention, sufficient information is included in the transcoded message to enable an appropriately preconfigured destination device to regenerate and verify the message code against the message code authenticated by the source device. Moreover, the transcoding system is such that the destination device can identify the nature of the transcoding operations performed on the original message, and this information can be used to further advantage by the destination device, for example by displaying this information to the user. Embodiments of the invention therefore provide an efficient and practical system giving a high degree of verifiability of transcoder operation.

In preferred embodiments, for the sake of simplicity, the omitted field code for a field is simply the data field code for that field, at least for some instances of a field to be omitted. Other systems can be envisaged, however, in which the omitted field code is otherwise related to the data field code, for example by further processing the data field code in some way to obtain an omitted field code from which the data field code can be derived by the destination device. Where derivation of the message code in the source device involves coding the data field codes for predetermined groups of fields to generate respective group codes, then in preferred embodiments, for a field to be omitted: if all fields in the corresponding group are to be omitted, then the omitted field code comprises the group code for that group, and the group of fields is replaced by said group code in the transcoded message; and if less than all fields in the corresponding group are to be omitted, then the omitted field code comprises the data field code for that field. Use of the group code to replace a group of fields in this way enables the resulting transcoded message to be simplified. An example of a type of coding system which may be employed as the said first coding system, and to which this method may be applied, is a hashing algorithm. In this case, the data field codes may be hash values calculated from the original data fields, and a "hash tree" may be calculated over these data field codes such that the aforementioned group codes are the hash values of parent nodes of the hash tree. This will be described in more detail below.

In some embodiments, the modified field code for a field could simply be the data field code for the received field. However, in preferred embodiments, when a received field is to be modified to produce a modified field including modified data, the modified field code is obtained by generating the data field code for the received field, coding the modified data in accordance with the first coding system to generate a modified data code, and representing the difference between that data field code and modified data code in the modified field code. The modified field code may represent the aforementioned difference in a number of ways. For example, the modified data code may simply be subtracted from the data field code to generate the modified field code. Alternatively, for example, an exclusive-OR operation may be applied to the data field code and modified data code to generate the modified field code. Other such reversible operations will be apparent to those skilled in the art, the point being that the destination device can regenerate the data field code from the modified data and the modified field code. Making the modified field code dependent on both the data field code and the modified data in the modified field provides an additional level of security, since malicious replacement of the modified data after the transcoding process would result in an erroneous data field code being derived at the destination device, and hence failure of the authentication process.

The present invention also provides a method of processing a data message, comprising a plurality of data fields and an authentication code, received from a source device wherein said data fields have been coded in accordance with a first coding system, whereby respective data field codes are generated for said data fields and a message code is derived from said data field codes, and wherein said message code has been coded in accordance with a second coding system to generate said authentication code, the method comprising transcoding the received data message by a transcoding method as described above, transmitting the transcoded message to the destination device, and, in said destination device:

deriving a received message code from the transcoded message using maintained fields, modified fields and omitted field codes in said message in accordance with said first coding system;

comparing the received message code with the message code encoded in said authentication code in accordance with said second coding system; and displaying a user message dependent upon the result of the message code comparison.

If the received message code does not tally with the authentication code, the resulting user message could simply indicate that the received message was invalid, and not display the message itself. However, at least if the received message code is identical to that encoded in the authentication code, the relevant content of the transcoded message, ie. at least the maintained data fields and modified data, can be displayed in the user message. The user message may also explicitly indicate that the message has been authenticated. In addition, in preferred embodiments the user message includes transcode indicators indicative of the location in the displayed message of fields omitted or modified in the transcoding process. This allows the user to make a personal assessment of whether the message should be relied upon. Moreover, in preferred embodiments where the original message sent by the source device is stored as part of the transcoding process, provision can be made for the destination device to request omitted fields, or the original content of modified fields, from the transcoder in response to a user input. These original fields can then be displayed to the user.

In general, where features are described herein with reference to a method of the invention, corresponding features may be provided in accordance with apparatus of the invention, and vice versa. Thus, for example, a further aspect of the present invention provides a transcoder for transcoding a data message, comprising a plurality of data fields and an authentication code, to produce a transcoded message for transmission to a destination device, the data message being received from a source device wherein said data fields have been coded in accordance with a first coding system, whereby respective data field codes are generated for said data fields and a message code is derived from said data field codes, and wherein said message code has been coded in accordance with a second coding system to generate said authentication code, the transcoder comprising:

a memory for storing the received data message;

transcoder logic configured to determine for each data field of the received data message whether to maintain, modify or omit that field, and to produce the transcoded message from the received data message; and means for transmitting the transcoded message to the destination device;

wherein the transcoder logic is configured to produce the transcoded message from the received data message by:

for a field to be maintained, maintaining that field in said transcoded message;

for a field to be omitted, coding the field in accordance with said first coding system to generate an omitted field code dependent upon the data field code for that field, and replacing that field by said omitted field code in the transcoded message;

for a field to be modified, coding that field in accordance with said first coding system to generate a modified field code dependent upon the data field code for that field, and replacing that field by a modified field, comprising modified data and said modified field code, in the transcoded message; and including said authentication code in the transcoded message.

Another aspect of the present invention provides a destination device for receiving a transcoded message from a transcoder as defined above, the device comprising a memory for storing a received transcoded message, a display, and control logic configured to:

derive a received message code from the transcoded message using maintained fields, modified fields and omitted field codes in said message in accordance with said first coding system;

compare the received message code with the message code encoded in said authentication code in accordance with said second coding system; and to supply a user message, dependent upon the result of the message code comparison, to the display for display to a user.

The invention further extends to a data delivery system comprising such a transcoder and one or more such destination devices. Moreover, the invention extends to a data communication system comprising such a data delivery system and a source device for generating a data message for transmission to a said destination device, the source device comprising message processing logic configured to:

divide data to be included in the data message into a plurality of data fields;

code said data fields in accordance with said first coding system whereby respective data field codes are generated for said data fields and a message code is derived from said data field codes;

and to code said message code in accordance with said second coding system to generate an authentication code for the message;

the source device including means for transmitting a data message, comprising said plurality of data fields and said authentication code, to the transcoder of said data delivery system.

The message code could be derived in various ways from the field codes depending on the particular nature of the first coding system employed. For example, the message code could be obtained by processing one or selected field codes, but preferably all field codes are used in derivation of the message code for the sake of security. While the message code could simply be the group of field codes collectively, in preferred embodiments the field codes are further processed to generate the message code. Similarly, while various encryption algorithms might be employed as said second coding system, a signing function can conveniently be used here.

BRIEF DESCRIPTION OF THE INVENTION

Preferred embodiments of the invention will now be described, by way of example, with reference to the accompanying drawings in which.

DETAILED DESCRIPTION OF THE INVENTION

Figure 1:
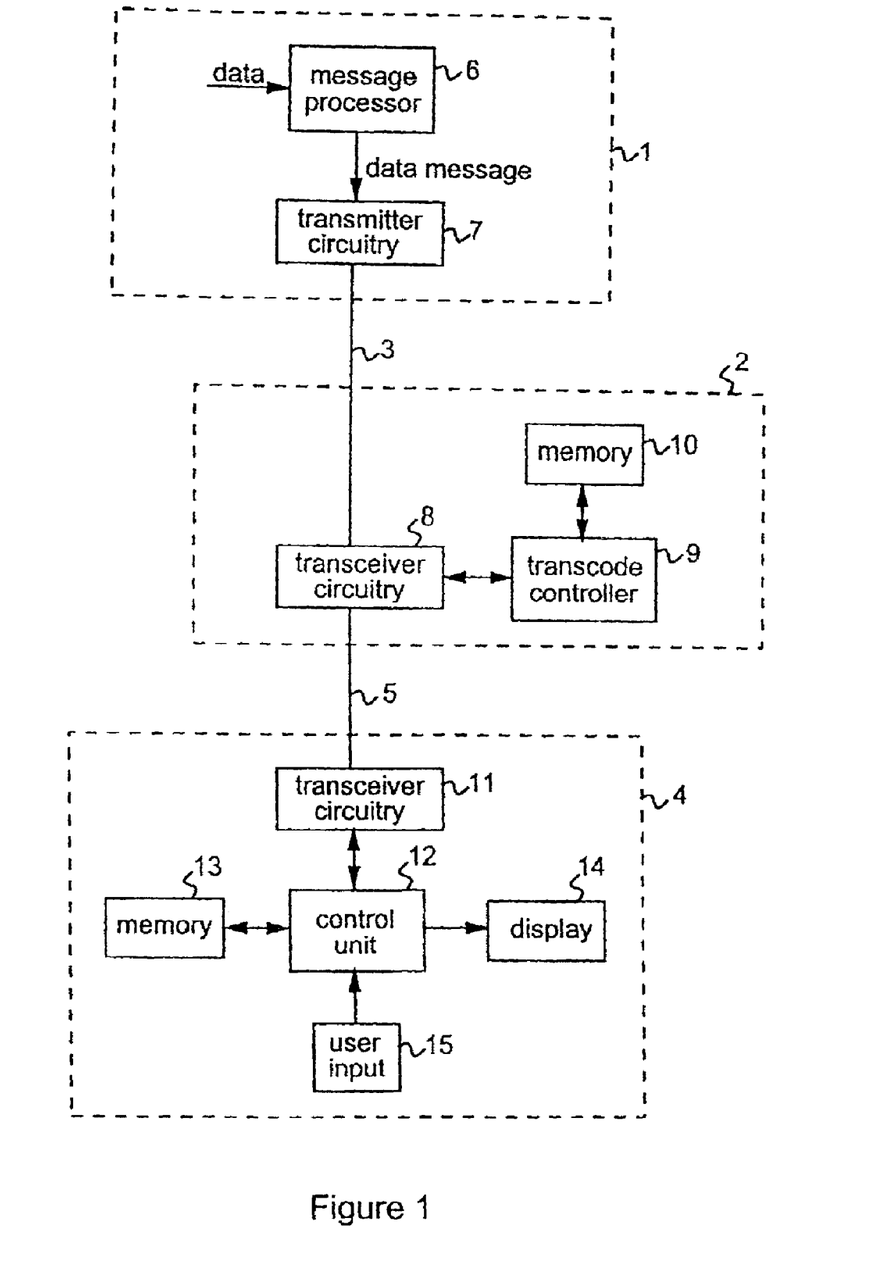
FIG. 1 is a schematic illustration of a data communication system embodying the invention.

FIG. 1 shows the main elements of a data delivery chain in a data communication system embodying the invention. As illustrated, the system includes a source device 1 which can communicate with a transcoder 2 via link 3. The source device 1 may be a server for a centralized processing or database system, for example a network server or an Internet server, and link 3 may be a hard-wired or a wireless link as appropriate. The transcoder 2 can communicate with a destination device 4 via link 5. The destination device 4 may be, for example, a portable device such as a hand-held computing device, pager or mobile phone, and may be one of a number of such devices with which the transcoder can communicate. The link 5 may again be a hard-wired or wireless link as appropriate depending on the nature of destination device 4.

The elements of the source device 1, transcoder 2 and destination device 4 involved in operation of the data communication method to be described below are illustrated schematically in the figure. In particular, the source device 1 includes processing logic in the form of message processor 6 for generating a data message to be transmitted to destination device 4. In this example, the processor 6 is configured by software to formulate the data message as described in more detail below. Alternatively, hard-wired logic may be used to implement the message processing logic in some embodiments. Either way, suitable implementations will be apparent to those skilled in the art from the description herein. While message processor 6 is illustrated for simplicity as having an input for receiving data from which the data message is to be formulated, in practice the message processing logic may be integrated with other functional logic in a processor performing various tasks for the source device, and the data in question may be generated by performance of such a task. Source device 1 also includes transmitter circuitry 7 for transmitting the data message to transcoder 2 via link 3, the specific implementation of the transmitter circuitry 7 depending on the nature of link 3. (While transmitter circuitry 7 is shown for the purposes of this description, in practice, of course, receiver circuitry via which the source device receives incoming communications may also be provided).

The transcoder 2 includes transceiver circuitry 8 for receiving data messages from source device 1 and communicating data with destination device 4. Again, the specific form of this circuitry depends on the nature of the links 3, 5. The transcoder 2 further includes transcoder logic in the form of transcode controller 9 for processing a received message to generate a transcoded message for onward transmission to the destination device 4. Transcode controller 9 may be implemented by a processor configured by appropriate software as will be apparent to those skilled in the art from the description herein. A memory 10 is associated with transcode controller 9 for temporary storage of received and transcoded messages.

Destination device 4 includes transceiver circuitry 11 for communicating data with transcoder 2, and control logic in the form of control unit 12, again implemented by a suitably programmed processor, for performing the message authentication functions described below and controlling operation of the device generally. The device further includes a memory 13, display 14 and user input means 15, for example a keypad, via which the user can input instructions to the control unit as described further below.

In operation, when a data communication is to be sent from source device 1 to destination device 2, the data is processed by message processor 6 as described further below to generate the data message which is transmitted to transcoder 2 via transmitter circuitry 7. The transcode controller 9 receives the data message from transceiver circuitry 8 and stores the message in memory 10. The transcode controller then determines for each field of the data message whether that field should be maintained, omitted or modified to produce a message in a form suitable for forwarding to the destination device 4. (The particular system by which the transcode controller makes this determination is not central to operation of the present invention and need not be discussed in detail here. Suffice to say that this process may be performed in various ways in accordance with known transcoding systems). The transcode controller generates the transcoded message from the received message as described in more detail below, the transcoded message being stored in memory 10. The transcoded message is then transmitted to destination device 4 via transceiver circuitry 8. At destination device 4, the transcoded message is received by control unit 12, via transceiver circuitry 11, and stored in memory 13. The control unit 10 then checks the authenticity of the received message and supplies a user message, dependent on the result of the authentication process, to display 14 for display to the user. These processes and subsequent operations available to the user will be described further below.

Operation of the message processor 6 of source device 1 will now be described in more detail. The message processor generates a data message from input data using first and second coding systems. The first coding system is also used by transcoder 2 to generate the transcoded message, and both of the first and second coding systems are employed in destination device 4 to authenticate a received transcoded message, the appropriate coding systems being preprogrammed in transcode controller 9 and control unit 12 in this embodiment. Prior to the coding stages, the message processor 6 first divides the input data into a number of data fields. The set of data fields form one portion of the data message to be sent to the transcoder. Division of the data into fields can be carried out in various ways, for example one field per word, sentence, paragraph or other specified data quantity, and may depend on the nature of the data content as appropriate. Since the transcoder 2 must be able to identify the individual data fields, field boundaries may be specifically indicated in the data message, for example by inclusion of field markers identifying the field boundaries. Alternatively, the transcoder may be preprogrammed with the field division system used by the message processor 6. Either way, once the fields have been defined, the message processor 6 then processes the fields to generate an authentication code to be included in the data message. This is a two-stage process employing both the first and second coding systems mentioned above. In the first stage, the first coding system is employed to generate a data field code for each data field and then to derive a message code from the data field codes. In the second stage, the resulting message code is encoded using the second coding system to generate the authentication code. In the present embodiment, a hashing algorithm is employed as the first coding system and a signing function is employed as the second coding system. Operation of the hashing algorithm is illustrated in FIG. 2.

Figures 2, 3:
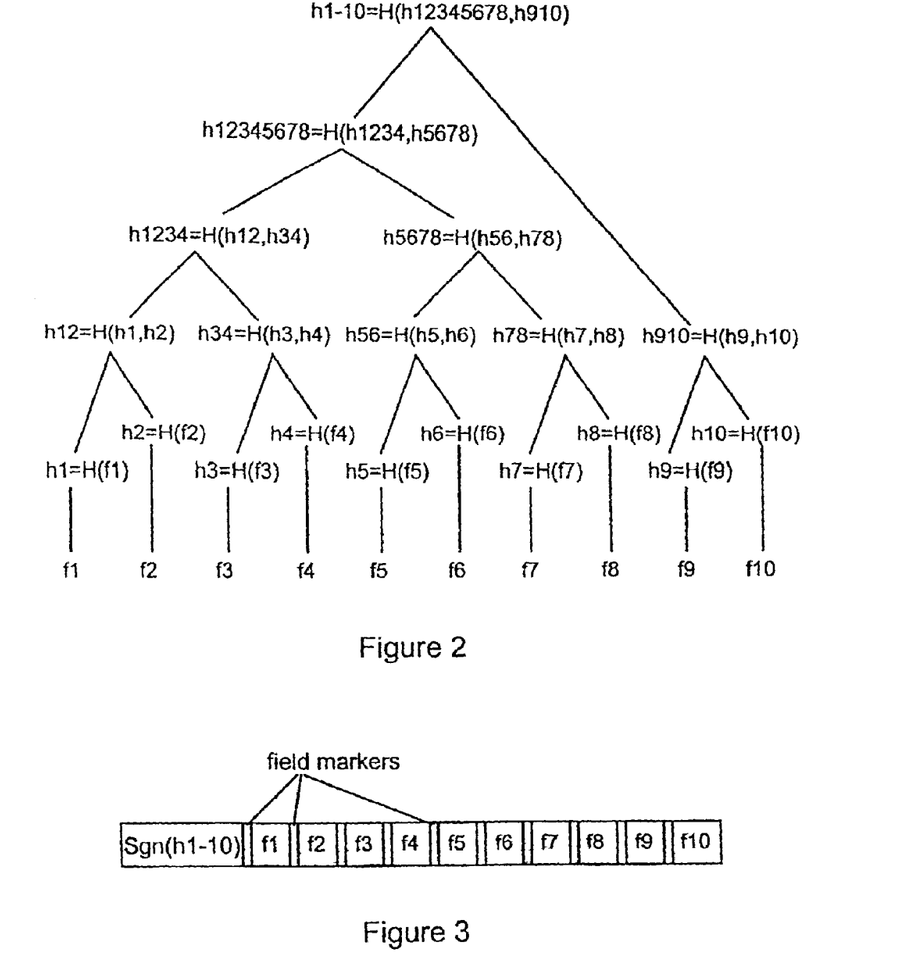
FIG. 2 illustrates the principle of a hashing algorithm employed as the first coding system in the embodiment of FIG. 1.
FIG. 3 is a schematic illustration of a simple data message format which may be employed in embodiments of the invention.

FIG. 2 illustrates successive steps of the hashing algorithm for the case where ten data fields f1 to f10 are included in the data message. In the first step, a hash function H is applied to each field f to generate a hash value H(f) as the data field code for that field. Thus, a set often field hash values, indicated as h1 to h10, are generated from the ten fields. A hash tree is then computed over the set of field hash values h1 to h10 whereby the hash function H is applied again to groups of the field hash values to generate group hash values corresponding to parent nodes of the hash tree, the hash function H then being applied iteratively to groups of the parent nodes, and so on until a single "root hash value" is obtained. In the particular example illustrated in the figure, the hash function H is applied to pairs of neighboring field hash values h1 to h10 to generate group hash values h12, h34, h56, h78 and h910 as indicated. The function H is reapplied to the first two pairs of these group hash values to generate group hash values h1234 and h5678. The function H is then reapplied to h1234 and h5678 to obtain group hash value h12345678. Finally, the function H is applied to group hash values h12345678 and h910 to obtain root hash value h1–10 which constitutes the message code for the data message.

After generation of the message code h1–10, the message processor 6 applies a signing function Sgn to the message code to generate the authentication code Sgn(h1–10). The authentication code is then added to the original data fields to form the data message to be sent to the transcoder 2. FIG. 3 illustrates an example of the resulting data message, consisting of the authentication code Sgn(h1–10) and ten data fields f1 to f10, with field markers employed to identify the field boundaries in this case. While this represents a simple example of a data message, it will be appreciated that the data message may be more complex in practice. For example, additional data may be included in the message, such as data relating to constraints to be applied to the transcoding process. Moreover, as will be apparent to those skilled in the art, addressing of messages to a particular transcoder and/or destination device will generally be handled by the transmission protocol employed by the system, eg. HTTP in the case of an Internet server. Such transmission protocols are not central to the present invention and need not be discussed here.

Figure 4:
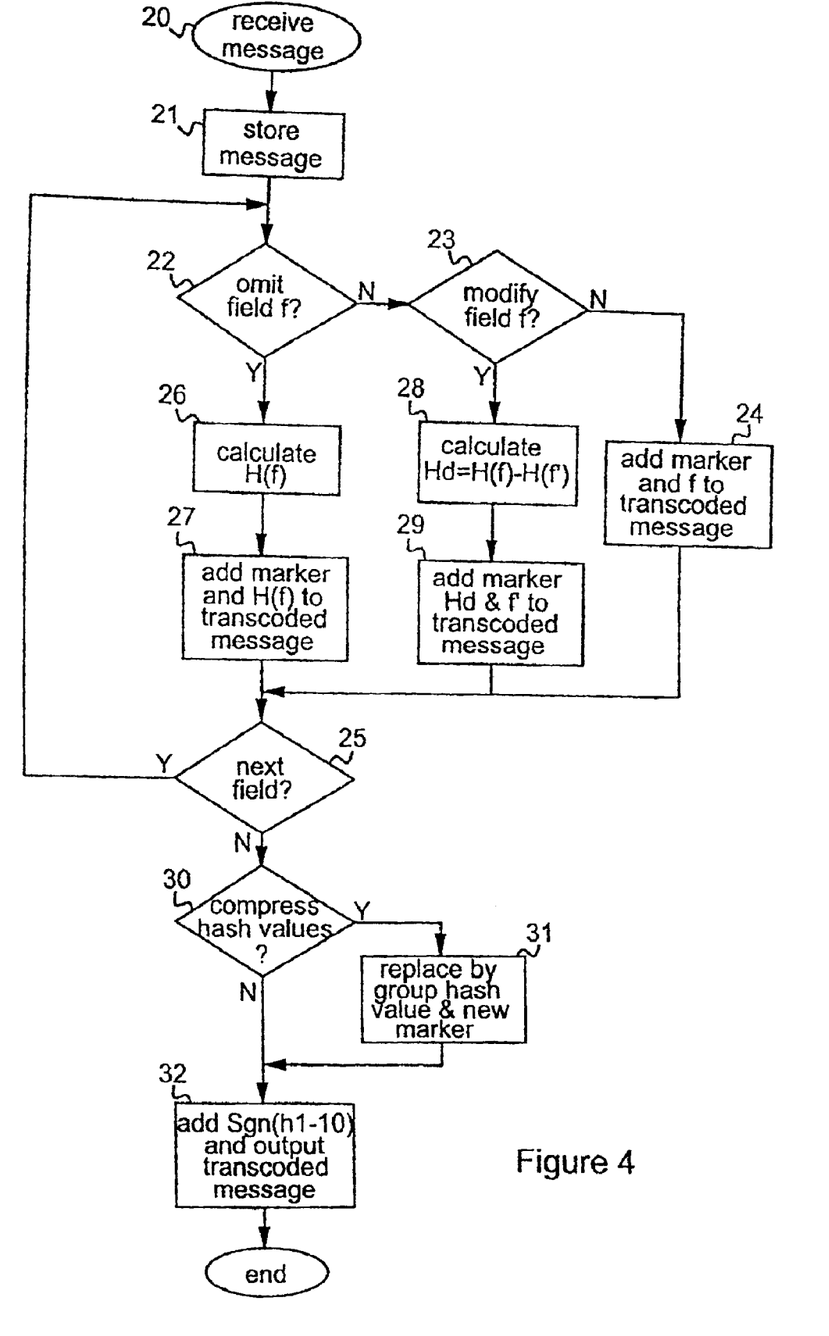
FIG. 4 is a flow chart describing operation of the transcoder in the system of FIG. 1 on receipt of a data message.

Operation of the transcoder 2 on receipt of the data message will now be described with reference to the flow chart of FIG. 4. This is essentially a two-stage process. In the first stage, the transcoder determines whether each field of the message should be maintained, modified or omitted, and calculates hash values as appropriate. In the second stage the transcoder determines whether the length of the transcoded message can be reduced by "compressing" hash values, ie. replacing the hash values for a succession of omitted fields by the group hash value for a parent node of the hash tree of FIG. 2. The process begins at step 20 when the data message is received by transcode controller 9. In step 21 the received message is stored by transcode controller 9 in memory 10. In step 22, the transcode controller 9 then analyses the first field f to determine if this field should be omitted from the message sent to the destination device. If the field is not to be omitted, the process proceeds to step 23 in which the transcode controller decides if the field should be modified in some way, eg. by altering the existing field content or replacing the field content by new data. If no modification is required, the existing field is to be maintained. In this case, operation proceeds to step 24 wherein the original field f, with added field marker, is stored in memory 10 as a first portion of the transcoded message. In this embodiment, the field marker added by the transcode controller includes data indicating the nature of the field content, ie. whether the field content represents a maintained, modified, or omitted field, to facilitate subsequent processing by the destination device. Thus the field marker added in step 24 here indicates that the field content is a maintained field. Operation then proceeds to step 25 wherein the transcode controller determines if there are any more fields of the received message to be considered. Assuming so, operation reverts to step 22 where the next field is considered for omission.

If it is determined in step 22 that the current field should be omitted, then in step 26 the transcode controller calculates an omitted field code in the form of the field hash value H(f) for the current field. Then, in step 27, the hash value H(f) is stored in memory as the next field of the transcoded message, with an associated field marker indicating that the field content is a hash value for an omitted data field. From step 27, operation proceeds again to step 25 in which the transcode controller 9 determines if there is a further field to be considered, and if so the process reverts to step 22 for analysis of this next field.

Returning to step 23, if it is decided here that the current field content should be modified to f', then operation proceeds to step 28. Here, the transcode controller calculates a modified field code in the form of the "delta hash value" Hd=H(f)–H(f'). Thus, the transcode controller applies the hash function H to both the original data field f and the modified data f' to obtain the original field hash value H(f) and also a modified field hash value H(f'). The arithmetic difference between these two is then taken as the delta hash value Hd. In step 29, Hd and the modified data f' are stored in memory 10, with an associated field marker, as the next field of the transcoded message. The field marker added here indicates that the field contains a delta hash value and modified data. Operation then proceeds to step 25, and reverts again to step 22 if there is a further field to be processed.

After all fields have been processed in this way so that no further fields are identified in step 25, the first stage of the transcoding process is complete. Operation then progresses to steps 30 to 32 which represent the second stage of the transcoding process. In step 30, the transcode controller analyzes the transcoded message stored in memory 10 to determine if it contains a series of field hash values which can be compressed. This is possible where there is a series of field hash values representing a group of omitted fields corresponding to parent node of the hash tree of FIG. 2. In particular, if all the fields corresponding to any parent node have been omitted, then it is sufficient to send the group hash value for that parent node in the transcoded message. For example, referring to FIG. 2, if fields f1 and f2 of the received message have been omitted, then the individual field hash values h1 and h2 in the transcoded message can be replaced by the group hash value h12. Similarly, if fields f1 to f4 have been omitted, then the field hash values h1 to h4 can be replaced by the group hash value h1234. Thus, the transcode controller checks whether the transcoded message contains a group of field hash values which can be compressed in this way, and if so operation proceeds to step 31. Here, the appropriate series of fields in the transcoded message is replaced by a single field containing the parent node hash value, and the field marker added in this case indicates the number of omitted fields which that hash value represents. Operation then proceeds to step 32.

In step 32, the authentication code Sgn(h1–10) from the originally received message is added to the transcoded message fields stored in memory 10, and the resulting transcoded message is output to the transceiver circuitry 8 for transmission to the destination device 4. Reverting to step 30, if it is determined here that the message does not contain a group of field hash values which can be compressed as described, then operation proceeds directly to step 32.

It will be seen from the above that, in constructing the final transcoded message which is sent to destination device 4, when it is decided to omit a field of the received message (but not all fields corresponding to a parent node in FIG. 2), then the original field is replaced by the field hash value in the transcoded message. When a group of fields in the received message which correspond to a parent node in the hash tree are omitted, then that group of fields is replaced by the parent node hash value in the transcoded message. When a field of the received message is to be modified, that field is replaced by the modified data and the appropriate delta hash value in the transcoded message. When it is decided to maintain a field of the received message, that field is simply maintained in the transcoded message. As a simple example, consider receipt of a data message with the content "Do you wish to transfer $10 from checking account A to savings account B?". If the received message contains fields f1 to f10 defined below, then the transcoder might generate a transcoded message with transcoded fields t1 to t9 as follows:

| Received Fields | Transcoder Action | Transcoded Fields |
| --- | --- | --- |
| f1 = "Do you" | omit | |
| f2 = "wish to" | omit | t1 = h12 |
| f3 = "transfer" | maintain | t2 = "transfer" |
| f4 = "$10" | maintain | t3 = "$10" |
| f5 = "from" | maintain | t4 = "from" |
| f6 = "checking account" | modify | t5 = Hd"checking" |
| f7 = "A" | maintain | t6 = "A" |
| f8 = "to" | maintain | t7 = "to" |
| f9 = "savings account" | modify | t8 = Hd"savings" |
| f10 = "B?" | maintain | t9 = "B?" |

In this example, it is assumed that the hashing algorithm of FIG. 2 is applied. Thus, since both fields f1 and f2 corresponding to parent node hash value h12 are omitted, transcoded field t1 replaces received fields f1 and f2. In transcoded fields t6 and t9, the delta hash value Hd is the difference between the received field hash value and the hash value for the modified data in each case.

In the above embodiment, the message received from source device 1 is retained in transcoder memory 10, the transcoded message being generated as described by reference to the stored message. The original message is thus available in memory if required later as described further below. In other embodiments, however, the transcoder may produce the transcoded message by operating directly on the stored message received from source device 1, overwriting received fields during the transcoding process.

Figure 5:
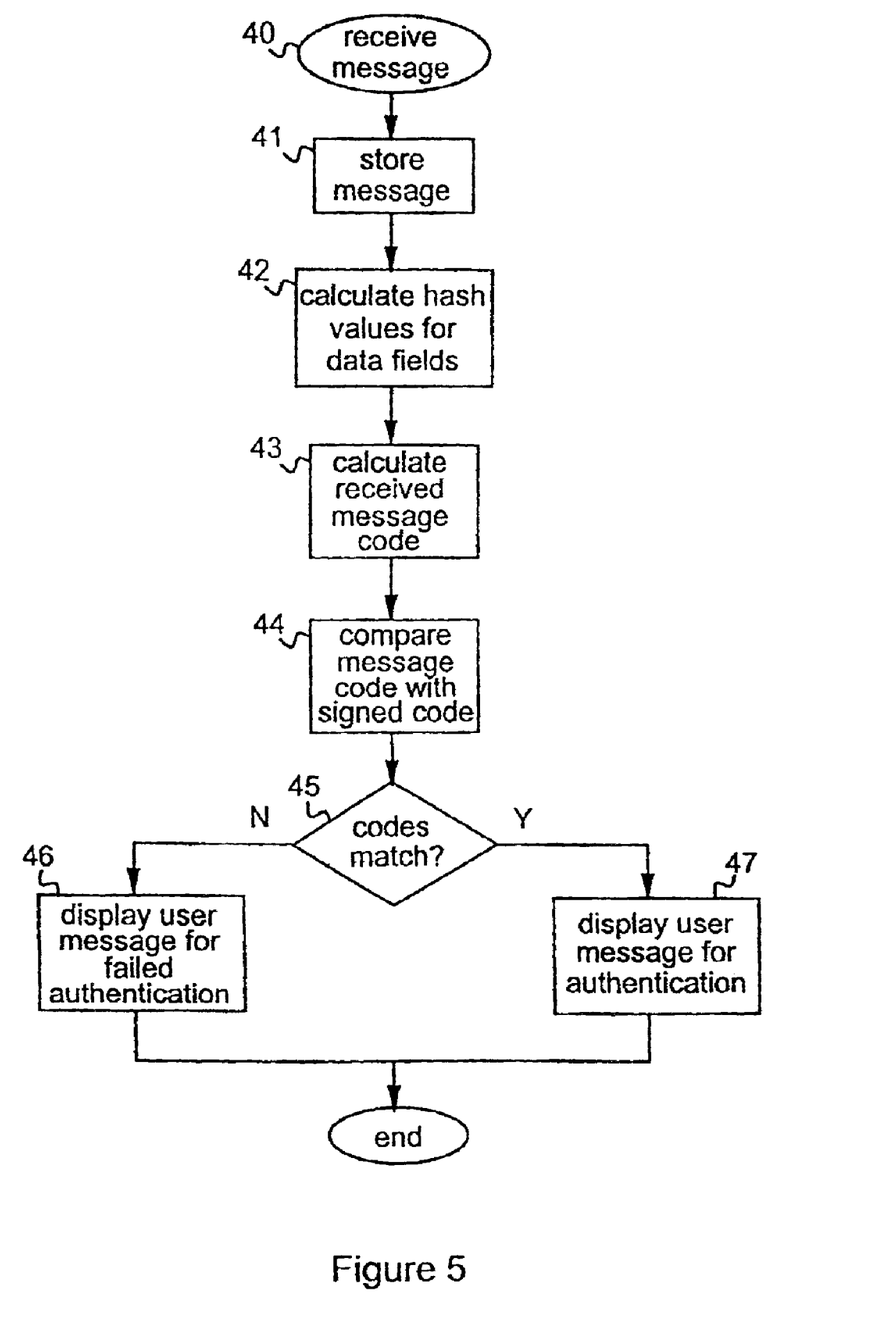
FIG. 5 is a flow chart describing operation of the destination device in FIG. 1 on receipt of a transcoded message.

Operation of the destination device control unit 12 will now be described with reference to the flow chart of FIG. 5. The process begins at step 40 when the transcoded message is received. In step 41, the control unit stores the transcoded message in memory 13. In step 42, the control unit uses the content of the transcoded fields to obtain a set of definitive hash values for the original message sent by source device 1. The operations performed in this step depend on whether a given transcoded field corresponds to a maintained, omitted or modified field. This may be identified by the control unit from the field content, an omitted field being indicated by a hash value, a modified field being indicated by a delta hash value plus ordinary data content, and data content alone signifying a maintained field. In the present embodiment, however, the nature of the field content is indicated by the field markers as described above. For maintained fields, the control unit applies the hash function H to the data content f to calculate the corresponding field hash values H(f). For a modified field, the control unit applies the hash function H to the data content f' to obtain the modified field hash value H(f'), and then adds this to the delta hash value Hd to obtain the original field hash value H(f). For omitted fields, the required hash values are provided by the transcoded fields themselves.

Following step 42, operation proceeds to step 43 wherein the control unit 12 calculates a received message code by applying the hash function H to the set of field/group hash values obtained in step 42 according to the tree structure of the hashing algorithm. In step 44 the control unit then compares the received message code with the original message code h1–10 in the authentication code Sgn(h1–10) of the transcoded message. The original message code is obtained here by decrypting Sgn(h1–10) using the appropriate public key, thus verifying the signature. In step 45 the control unit determines whether the received message code is identical to the original message code h1–10. If the codes do not match then the authentication process has failed and it can be assumed that the original message has been tampered with and should not be relied upon. In this case, in step 46 the control unit supplies an appropriate user message to display 14 for display to the user. For example, the displayed message may comprise the relevant content of the received transcoded message and a warning that the message failed the authentication process.

Returning to step 45, assuming that the codes are determined to match here, then in step 47 the control unit supplies the relevant content of the transcoded message, ie the message content of the maintained and modified fields, to the display 14. The displayed message can also indicate that the message has been authenticated, and preferably also indicates where fields have been modified or omitted as compared with the original message. As an example, for the transcoded message discussed above, the displayed message might read:

Authenticated Message Received:

[dropped fields] transfer $10 from checking[modified field] A to savings[modified field] B?

The fact that the message has been authenticated assures the user that the document has not been altered beyond the omission and modification of fields during transcoding as indicated in the display. Moreover, the transcoding process must have been performed using the hashing algorithm as described above to generate the correct codes for omitted and modified fields. In addition, the system may allow the user to retrieve selected modified or omitted fields in case of doubt over whether the semantic content of a message has been altered in the transcoding process. In the present embodiment, for example, the user can select a displayed transcode indicator, ie "[dropped field]", "[modified field]" etc. in the displayed message using input means 15. On receipt of such an input, the control unit 12 transmits a request for the original field to transcoder 2 via transceiver circuitry 11. This request identifies the particular field required, for example by a field number identifying the location of the required field in the transcoded message. However identified, the transcode controller retrieves the required field from its memory 10, and forwards the field to the destination device 4 for display to the user.

It will be seen from the above that a highly efficient system is provided allowing verification of transcoder operation through elegantly simple processing operations which are practical to implement in system devices. It will be appreciated, however, that while preferred embodiments of the invention have been described in detail above, many changes and modifications may be made to the embodiments described without departing from the scope of the invention.

What is claimed is:

1. A method of transcoding a data message, comprising a plurality of data fields and an authentication code, to produce a transcoded message for transmission to a destination device, the data message being received from a source device wherein said data fields have been coded in accordance with a first coding system, whereby respective data field codes are generated for said data fields and a message code is derived from said data field codes, and wherein said message code has been coded in accordance with a second coding system to generate said authentication code, the method comprising:

determining for each data field of the received data message whether to maintain, modify or omit that field;

for a field to be maintained, maintaining that field in said transcoded message;

for a field to be omitted, coding the field in accordance with said first coding system to generate an omitted field code dependent upon the data field code for that field, and replacing that field by said omitted field code in the transcoded message;

for a field to be modified, coding that field in accordance with said first coding system to generate a modified field code dependent upon the data field code for that field, and replacing that field by a modified field, comprising modified data and said modified field code, in the transcoded message; and including said authentication code in the transcoded message.

2. A method as claimed in claim 1 wherein, for at least some instances of a field to be omitted, the omitted field code comprises the data field code for that field.

3. A method as claimed in claim 2 wherein said message code has been derived in said source device by coding the data field codes for predetermined groups of fields to generate respective group codes, and wherein, for a field to be omitted:

if all fields in the corresponding group are to be omitted, then the omitted field code comprises the group code for that group, and the group of fields is replaced by said group code in the transcoded message;

if less than all fields in the corresponding group are to be omitted, then the omitted field code comprises the data field code for that field.

4. A method as claimed in claim 1 wherein, for a field to be modified, the modified field code is generated by generating the data field code for that field and coding said modified data in accordance with said first coding system to generate a modified data code, said modified field code being representative of the difference between that data field code and said modified data code.

5. A method as claimed in claim 1 further comprising inserting markers in the transcoded message, each marker indicating whether a respective portion of the transcoded message corresponds to a maintained, modified or omitted field of the received data message.

6. A method as claimed in claim 1 wherein said first coding system is a hashing algorithm whereby said data field codes are hash values.

7. A method as claimed in claim 3 wherein:

said first coding system is a hashing algorithm whereby said data field codes are hash values;

said message code is the root hash value of a hash tree calculated from said data field codes; and said group codes are the hash values of respective parent nodes of said hash tree.

8. A method of processing a data message, comprising a plurality of data fields and an authentication code, received from a source device wherein said data fields have been coded in accordance with a first coding system, whereby respective data field codes are generated for said data fields and a message code is derived from said data field codes, and wherein said message code has been coded in accordance with a second coding system to generate said authentication code, the method comprising:

producing a transcoded message from the received data message by: determining for each data field of the received data message whether to maintain, modify or omit that field; for a field to be maintained, maintaining that field in said transcoded message p for a field to be omitted, coding the field in accordance with said first coding system to generate an omitted field code dependent upon the data field code for that field, and replacing that field by said omitted field code in the transcoded message; for a field to be modified, coding that field in accordance with said first coding system to generate a modified field code dependent upon the data field code for that field, and replacing that field by a modified field, comprising modified data and said modified field code, in the transcoded message; and including said authentication code in the transcoded message;

transmitting the transcoded message to a destination device; and in said destination device: deriving a received message code from the transcoded message using maintained fields, modified fields and omitted field codes in said message in accordance with said first coding system; comparing the received message code with the message code encoded in said authentication code in accordance with said second coding system; and displaying a user message dependent upon the result of the message code comparison.

9. A method as claimed in claim 8 wherein, at least if the received message code is identical to the message code encoded in said authentication code, said user message comprises the maintained data fields and said modified data from the transcoded message.

10. A method as claimed in claim 9 wherein said user message comprises transcode indicators indicative of the location in the displayed message of fields omitted or modified from the data message as sent by the source device.

11. A method as claimed in claim 10 further comprising:

storing data fields received from said source device which fields are omitted or modified in producing the transcoded message;

transmitting a stored data field to the destination device in response to a transcoded field request from the destination device; and at the destination device, displaying the stored field received pursuant to said request.

12. A transcoder for transcoding a data message, comprising a plurality of data fields and an authentication code, to produce a transcoded message for transmission to a destination device, the data message being received from a source device wherein said data fields have been coded in accordance with a first coding system, whereby respective data field codes are generated for said data fields and a message code is derived from said data field codes, and wherein said message code has been coded in accordance with a second coding system to generate said authentication code, the transcoder comprising:

a memory for storing the received data message;

transcoder logic configured to determine for each data field of the received data message whether to maintain, modify or omit that field, and to produce the transcoded message from the received data message; and means for transmitting the transcoded message to the destination device;

wherein the transcoder logic is configured to produce the transcoded message from the received data message by:

for a field to be maintained, maintaining that field in said transcoded message;

for a field to be omitted, coding the field in accordance with said first coding system to generate an omitted field code dependent upon the data field code for that field, and replacing that field by said omitted field code in the transcoded message;

for a field to be modified, coding that field in accordance with said first coding system to generate a modified field code dependent upon the data field code for that field, and replacing that field by a modified field, comprising modified data and said modified field code, in the transcoded message; and including said authentication code in the transcoded message.

13. A transcoder as claimed in claim 12 wherein, for at least some instances of, a field to be omitted, the omitted field code comprises the data field code for that field.

14. A transcoder as claimed in claim 13 for transcoding a received data message for which said message code has been derived in said source device by coding the data field codes for predetermined groups of fields to generate respective group codes, wherein the transcoder logic is configured such that, for a field to be omitted:

if all fields in the corresponding group are to be omitted, then the omitted field code generated by the transcoder logic comprises the group code for that group, and the transcoder logic replaces that group of fields by said group code in the transcoded message;

if less than all fields in the corresponding group are to be omitted, then the omitted field code generated by the transcoder logic comprises the data field code for that field.

15. A transcoder as claimed in claim 12 wherein, for a field to be modified, the transcoder logic is configured to generate the modified field code by generating the data field code for that field and coding said modified data in accordance with said first coding system to generate a modified data code, said modified field code being representative of the difference between that data field code and said modified data code.

16. A transcoder as claimed in claim 12 wherein the transcoder logic is configured to insert markers in the transcoded message, each marker indicating whether a respective portion of the transcoded message corresponds to a maintained, modified or omitted field of the received data message.

17. A transcoder as claimed in claim 12 wherein said first coding system is a hashing algorithm whereby said data field codes are hash values.

18. A transcoder as claimed in claim 14 wherein:

said first coding system is a hashing algorithm whereby said data field codes are hash values;

said message code is the root bash value of a hash tree calculated from said data field codes; and said group codes are the hash values of respective parent nodes of said hash tree.

19. A transcoder as claimed in claim 12 wherein the transcoder logic is further configured to output a stored field of the received data message to the transmitter means for transmission to the destination device in response to receipt of a transcoded field request from the destination device.

20. A destination device for receiving a transcoded message from a transcoder as claimed in claim 12, the destination device comprising a memory for storing a received transcoded message, a display, and control logic configured to:

derive a received message code from the transcoded message using maintained fields, modified fields and omitted field codes in said message in accordance with said first coding system;

compare the received message code with the message code encoded in said authentication code in accordance with said second coding system; and to supply a user message, dependent upon the result of the message code comparison, to the display for display to a user.

21. A device as claimed in claim 20 wherein, at least if the received message code is identical to the message code encoded in said authentication code, said user message comprises the maintained data fields and said modified data from the transcoded message.

22. A device as claimed in claim 21 wherein said user message includes transcode indicators indicative of the location in the displayed message of fields omitted or modified from the data message as sent by the source device.

23. A destination device for receiving a transcoded message from a transcoder as claimed in claim 19, the destination device comprising a memory for storing a received transcoded message, a display, user input means, means for transmitting a said transcoded field request to the transcoder, and control logic configured to;

derive a received message code from the transcoded message using maintained fields, modified fields and omitted field codes in said message in accordance with said first coding system;

compare the received message code with the message code encoded in said authentication code in accordance with said second coding system;

supply a user message, dependent upon the result of the message code comparison, to the display for display to a user;

and to generate said transcoded field request in response to a user input via said input means.

24. A data communication system comprising:

a transcoder for transcoding a data message, comprising a plurality of data fields and an authentication code, to produce a transcoded message for transmission to a destination device, the data message being received from a source device wherein said data fields have been coded in accordance with a first coding system, whereby respective data field codes are generated for said data fields and a message code is derived from said data field codes, and wherein said message code has been coded in accordance with a second coding system to generate said authentication code; and at least one destination device for receiving said transcoded message from the transcoder;

wherein the transcoder comprises:

a memory for storing the received data message; transcoder logic configured to determine for each data field of the received data message whether to maintain, modify or omit that field, and to produce the transcoded message from the received data message; and means for transmitting the transcoded message to said destination device;

said transcoder logic being configured to produce the transcoded message from the received data message by: for a field to be maintained, maintaining that field in said transcoded message; for a field to be omitted, coding the field in accordance with said first coding system to generate an omitted field code dependent upon the data field code for that field, and replacing that field by said omitted field code in the transcoded message; for a field to be modified, coding that field in accordance with said first coding system to generate a modified field code dependent upon the data field code for that field, and replacing that field by a modified field, comprising modified data and said modified field code, in the transcoded message; and including said authentication code in the transcoded message;

and wherein said destination device comprises a memory for storing a received transcoded message, a display, and control logic configured to derive a received message code from the transcoded message using maintained fields, modified fields and omitted field codes in said message in accordance with said first coding system, to compare the received message code with the message code encoded in said authentication code in accordance with said second coding system, and to supply a user message, dependent upon the result of the message code comparison, to said display for display to a user.

25. A data communication system as claimed in claim 24 including a source device for generating a data message, the source device comprising:

message processing logic configured to divide data to be included in a data message into a plurality of data fields, to code said data fields in accordance with said first coding system whereby respective data field codes are generated for said data fields and a message code is derived from said data field codes, and to code said message code in accordance with said second coding system to generate an authentication code for the message; and means for transmitting a data message, comprising said plurality of data fields and said authentication code, to said transcoder.

\* \* \* \* \*